United States Patent
Hester et al.

(10) Patent No.: US 9,999,949 B2
(45) Date of Patent: Jun. 19, 2018

(54) WORK PIECE PRESENTMENT

(75) Inventors: Grant Nicholas Hester, Longmont, CO (US); John Rigsby, Longmont, CO (US)

(73) Assignee: SEAGATE TECHNOLOGY LLC, Scotts Valley, CA (US)

( * ) Notice: Subject to any disclaimer, the term of this patent is extended or adjusted under 35 U.S.C. 154(b) by 2355 days.

(21) Appl. No.: 11/855,975

(22) Filed: Sep. 14, 2007

(65) Prior Publication Data
US 2009/0071973 A1    Mar. 19, 2009

(51) Int. Cl.
*B65G 25/00* (2006.01)
*B23P 19/00* (2006.01)

(52) U.S. Cl.
CPC .................. *B23P 19/003* (2013.01)

(58) Field of Classification Search
CPC ..................................... B23P 19/003
USPC ........ 221/265, 183, 274, 190, 186; 227/147, 227/112, 119, 39; 198/409, 468.11, 198/468.9, 408; 29/243.53; 53/55
See application file for complete search history.

(56) References Cited

U.S. PATENT DOCUMENTS

| | | | |
|---|---|---|---|
| 1,074,158 A * | 9/1913 | Dauber | B25C 1/001 118/200 |
| 2,918,198 A * | 12/1959 | Kjellsen et al. | 221/211 |
| 3,466,730 A * | 9/1969 | Amtsberg et al. | 29/718 |
| 4,044,462 A * | 8/1977 | Anselmo | B21J 15/32 198/468.6 |
| 4,128,174 A * | 12/1978 | Frisbie | B07C 5/344 198/408 |
| 4,141,457 A * | 2/1979 | Nocek | G03F 7/2014 198/403 |
| 4,222,495 A | 9/1980 | Kaneko | |
| 4,593,845 A * | 6/1986 | Andersson | B25B 23/06 227/112 |
| 4,694,974 A * | 9/1987 | Heck et al. | 221/263 |
| 4,732,296 A | 3/1988 | Heck et al. | |
| 4,819,326 A * | 4/1989 | Stannek | H05K 13/0404 29/741 |
| 4,832,176 A | 5/1989 | Okuma et al. | |
| 4,907,718 A | 3/1990 | Emmerich | |
| 5,004,141 A | 4/1991 | Young et al. | |
| 5,067,632 A | 11/1991 | Aubry | |
| 5,155,981 A * | 10/1992 | Tordini | B65B 35/18 198/468.4 |
| 5,193,717 A * | 3/1993 | Rink et al. | 221/233 |
| 5,337,636 A | 8/1994 | Shea | |
| 5,351,392 A * | 10/1994 | Wing | B21J 15/32 29/809 |
| 5,392,954 A | 2/1995 | Gartz | |
| 5,425,473 A | 6/1995 | Kvalheim | |

(Continued)

*Primary Examiner* — Rakesh Kumar
(74) *Attorney, Agent, or Firm* — Hall Estill Attorneys at Law

(57) ABSTRACT

An apparatus and associated method are provided for an automated presentment assembly that sequentially feeds fasteners to an outlet and an escapement apparatus comprising a chuck that has a transport feature for selectively removing a fastener from the outlet and transporting the fastener to a tool station, the chuck being moveable between a first position and a second position, wherein at the first position the transport feature is operably aligned with the outlet and at the second position the transport feature is displaced both linearly and rotationally from the first position.

18 Claims, 4 Drawing Sheets

(56) References Cited

U.S. PATENT DOCUMENTS

| | | | | |
|---|---|---|---|---|
| 5,480,087 | A * | 1/1996 | Young | B23P 19/003 |
| | | | | 221/268 |
| 5,542,524 | A * | 8/1996 | Sakoda | B23P 19/003 |
| | | | | 198/409 |
| 6,199,740 | B1 | 3/2001 | Benes et al. | |
| 6,494,354 | B2 * | 12/2002 | Hotch et al. | 227/109 |
| 6,499,270 | B2 * | 12/2002 | Peroni et al. | 53/53 |
| 6,564,923 | B2 | 5/2003 | Reiter | |
| 6,951,298 | B1 * | 10/2005 | Cogley et al. | 227/147 |
| 7,934,355 | B2 * | 5/2011 | Strub | A61J 1/035 |
| | | | | 198/428 |
| 2006/0185149 | A1 * | 8/2006 | Erdman et al. | 29/525.01 |
| 2007/0251804 | A1 * | 11/2007 | Hahnel | B65G 47/918 |
| | | | | 198/469.1 |

* cited by examiner

WORK PIECE PRESENTMENT

BACKGROUND

Machinery and methods employed in the manufacturing industry have been continuously shaped by a number of market and business forces. For example, many manufactured products today are relatively more complex than those in the past, as high technology electronics have proliferated to become integrated even into commonly used consumer goods. Flexibility is key to a manufacturer's survival, as smaller lot runs of products having different feature sets must be produced on the same production line. And while the list of feature offerings continually grows, the opposite is true for the size in which they are packaged, because miniaturization and portability are important market factors as well. Add to the mix the fact that price demands have forced a greater emphasis on efficiency to the extent that processing station cycle time is scrutinized to a fraction of a second.

To keep pace with these evolving factors manufacturers are continually striving to replace manual operations with highly-complex and processor-controlled automated systems. Successful efforts have also been employed to reengineer the factory to assemble all components just-in-time instead of batch processing. Product design and process capability analyses are directed toward building quality into the process rather than inspecting it into the product. Ultimately, the measure of quality for an entire manufacturing operation depends on the quality of each of its numerous process steps.

These and other recent improvements in the art have significantly enhanced the manufacturer's ability to manufacture quality products at a competitive price. It is to the furthering of those efforts that the embodiments of the present invention are directed.

SUMMARY

Embodiments of the present invention are generally directed to tooling devices used in a manufacturing process.

In some embodiments an apparatus and associated method are provided for an automated work piece presentment assembly that sequentially feeds fasteners to an outlet, and an escapement apparatus comprising a chuck that has a transport feature for selectively removing a fastener from the outlet and transporting the fastener to a tool station, the chuck being moveable between a first position and a second position, wherein at the first position the transport feature is operably aligned with the outlet and at the second position the transport feature is displaced both linearly and rotationally from the first position.

These and various other features and advantages which characterize the claimed embodiments will become apparent upon reading the following detailed description and upon reviewing the associated drawings.

DETAILED DESCRIPTION

Figure 1:
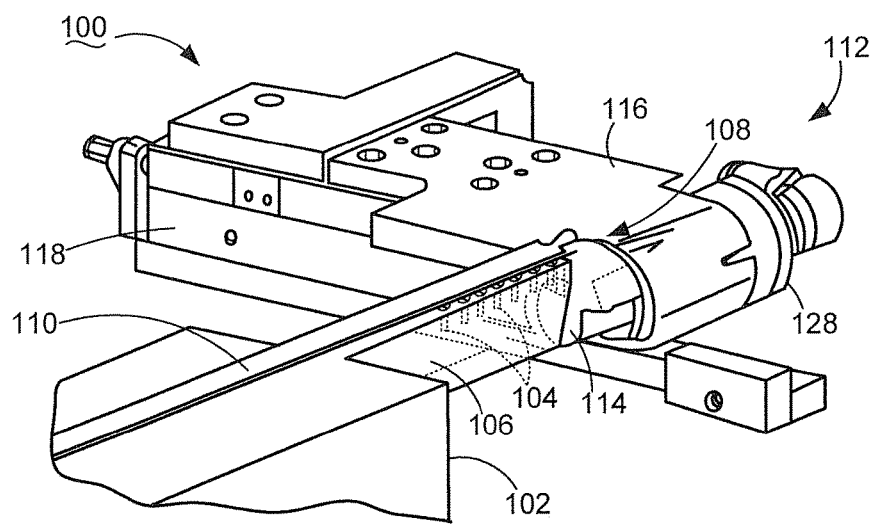
FIG. 1 is an isometric depiction of a fastener presentment apparatus that is constructed in accordance with embodiments of the present invention.

Referring to the drawings in general, and more particularly to FIG. 1 that shows an automated fastener presenter 100. The presenter 100 has a container 102 into which a bulk supply of work pieces are held in a completely random order. In the description that follows the work pieces are fasteners, such as threaded joining members and rivets and the like, although the present embodiments as claimed are not so limited. Other embodiments can be readily adapted to present other types of work pieces that are supplied in bulk to a process requiring that they be individually oriented for processing.

In the illustrative embodiments of FIG. 1 the container 102 is part of a vibratory feeder that draws fasteners 104 from their random state and orients them sequentially into a queue between opposing rails 106. The rails 106 are spatially separated to define a channel therebetween that is sized to receivingly engage the shank portion of the fastener 104 while supportingly engaging the head portion of the fastener 104. The effects of gravity are conducive to urging the fasteners 104 into the queue, which terminates at an outlet 108 defined by distal ends of the rails 106. A cover 110 can be provided clearingly above the queued fasteners 104 to aid in retaining them within the queue.

For illustrative purposes the fasteners 104 are depicted in FIG. 1 as being queued in a first longitudinal disposition associated with their heads, or "engagement ends," directed upwardly. The present embodiments solve the problems associated with needing the fasteners 104 ultimately oriented in a different longitudinal disposition at a tool station that engagingly drives the fasteners 104. For instance, in the description that follows the fasteners 104 are reoriented from a longitudinally downward directed shank disposition (or "head up") in the queue to a longitudinally upward directed shank disposition (or "head down") at the tool station. Those particular orientations, however, are merely illustrative and not limiting of the claimed embodiments.

Figure 2:
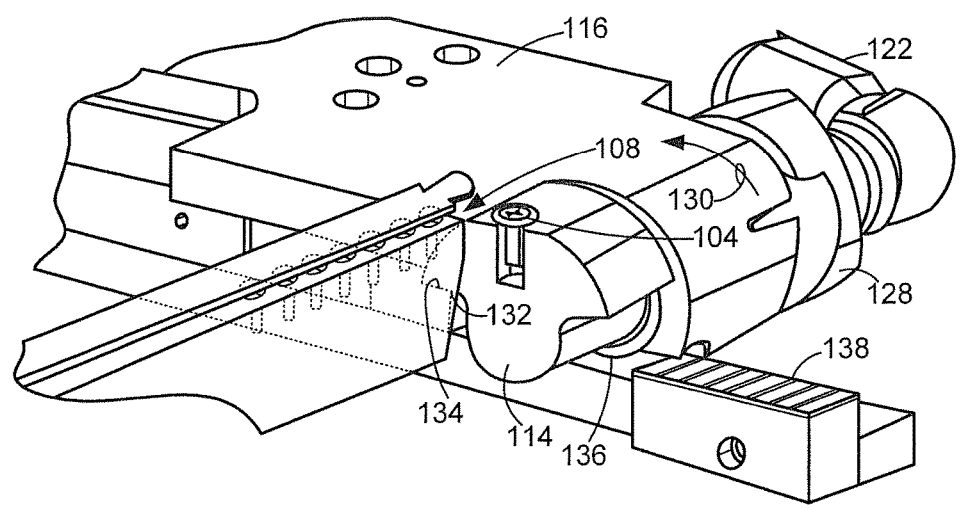
FIG. 2 is an enlarged depiction of a portion of the apparatus of FIG. 1 after a small linear displacement of the chuck from the queue.

Generally, the presenter 100 has an escapement 112 that individually removes the fasteners 104 from the outlet 108 and reorients them. The escapement includes a chuck 114 having a transport feature (shown below) for capturing fasteners 104 from the queue. FIG. 1 shows the chuck 114 positioned so as to operably align its transport feature with the outlet 108. The chuck 114 is supported by a body 116 which, in turn, is mounted to a linear slide 118. Activating the linear slide 118 thereby displaces the chuck 114 linearly away from the outlet 108, as shown in FIG. 2. FIG. 2 also shows that in these illustrative embodiments the transport feature is a cavity 120 that is sized to receivingly engage a fastener 104 from the outlet 108 in a manner similar to the way it was supported in the queue. A vacuum pump 122 is employed to selectively communicate a fluid force to the cavity 120 in order to counteract external forces, such as gravity and centrifugal forces, to retain the removed fastener 104 therein. The cavity 120 and vacuum force function as a gripper that selectively removes the removed fastener 104 from the queue and reorients the removed fastener at the tool station.

Figure 3:
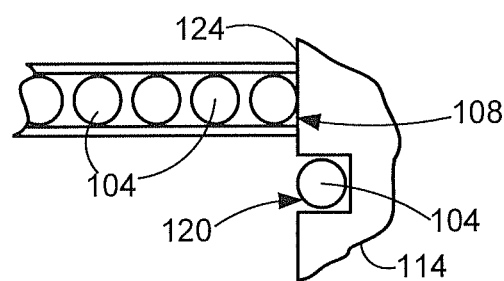
FIG. 3 is a diagrammatic top view depicting the stripping surface of the chuck.
Figure 4:
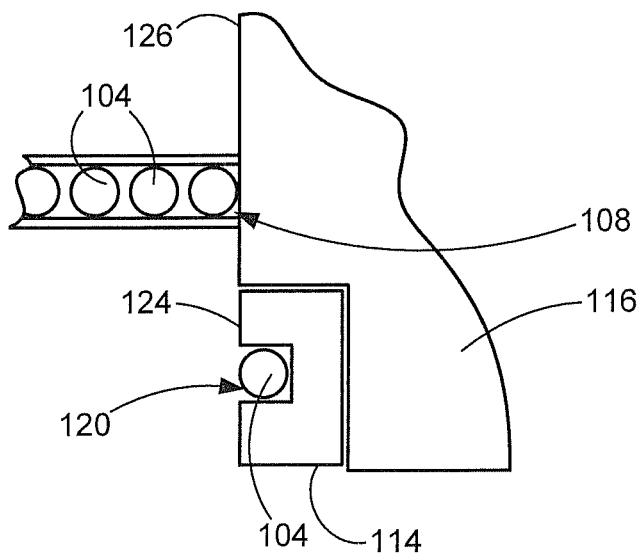
FIG. 4 is a diagrammatic top view depicting the stripping surface of the body.

FIGS. 3 and 4 are diagrammatical depictions of the fasteners 104 in the queue and the removed fastener 104 in the cavity 120, but with the heads of the fasteners 104 not shown for clarity. FIG. 3 shows the chuck 114 after a very small displacement where the cavity 120 has just cleared the outlet 108 after capturing a fastener 104. The chuck 114 defines a stripping surface 124 adjacent to the cavity 120 that is slidingly disposed in a close mating relationship with the outlet 108. The stripping surface 124 thereby effectively closes the outlet 108 to retain the queue of fasteners 104 when the chuck 114 is operatively displaced away from the position of FIG. 1. FIG. 4 shows the chuck 114 after a subsequent displacement whereat the body 116 provides a second stripping surface 126 that effectively functions as a continuation of the first stripping surface 124 when the chuck 114 is displaced farther away from the outlet 108.

Returning to FIG. 2, the body 116 also journals the chuck 114 around an axis of rotation that is substantially orthogonal to the direction of its linear displacement. In the illustrative embodiments a coil spring is wound inside a housing 128 to bias the chuck 114 to a rotational orientation associated with the cavity 120 being operably aligned with the outlet 108. The biasing force urges the chuck 114 in a counterclockwise direction as indicated by the reference arrow 130. The chuck 114 defines a protuberant surface 132 that abuttingly engages a positive stop surface 134 portion of the body 116 to match the ultimate biased rotational alignment of the chuck 114 to that of the outlet 108.

Figure 5:
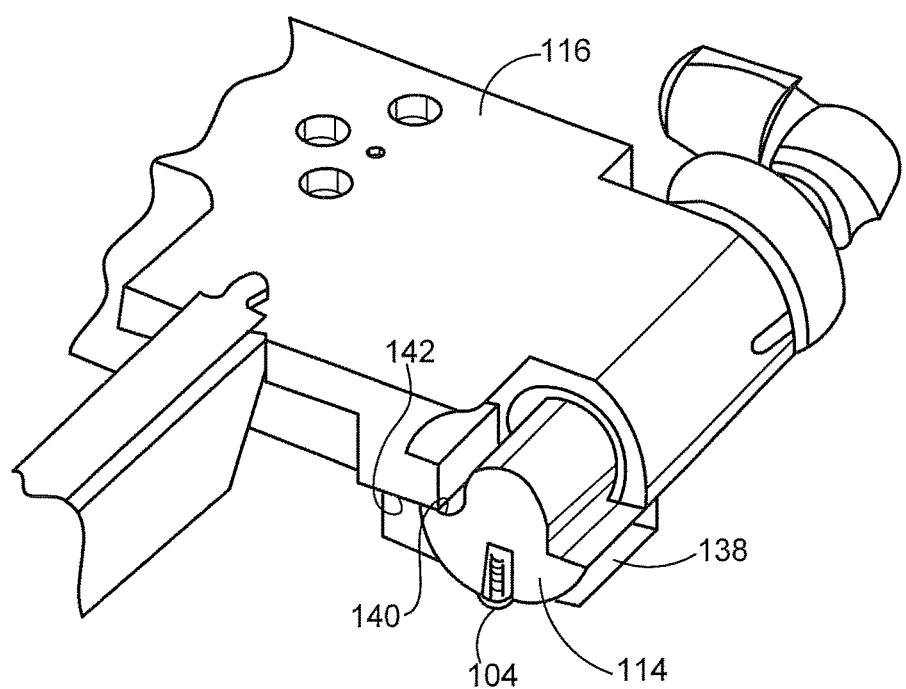
FIG. 5 is a view similar to FIG. 1 but with the fastener having been linearly and rotationally displaced to a head down longitudinal disposition.

The escapement 112 in the illustrative embodiments further includes a pinion 136 that is fixed in rotation with the chuck 114. The slide 118 displaces the pinion 136 linearly coincident with the chuck 114 to ultimately engage a rack 138 that is disposed in its path of linear travel. The rack 138 meshingly engages the pinion 136 to rotate the chuck 114 in response to the linear displacement. FIG. 5 depicts the chuck 114 having thus been rotated 180 degrees, reorienting the fastener 104 to a head down longitudinal disposition. Another protuberant surface 140 of the chuck 114 can be used to abuttingly engage an opposing surface 142 of the positive stop portion of the body 116 to precisely reorient the fastener 104.

The illustrative embodiments described provide a relatively inexpensive mechanical arrangement whereby the chuck 114 rotational displacement is passively responsive to its powered linear displacement. The skilled artisan will appreciate that in alternative equivalent embodiments the rotational displacement could be powered, such as by coupling the chuck 114 to a motor 128 instead of the coil spring. In such an arrangement, and provided the rack 138 and pinion 136 meshing engagement, the linear displacement could be made passively responsive to a powered rotational displacement of the chuck 114. In yet other equivalent alternative embodiments both the linear and rotational displacements could be powered, eliminating the need for the rack 138 and pinion 136 meshing engagement. The latter embodiments, while more expensive, also provide relatively more flexibility in that the linear and rotational displacements could occur independently of each other.

Figure 6:
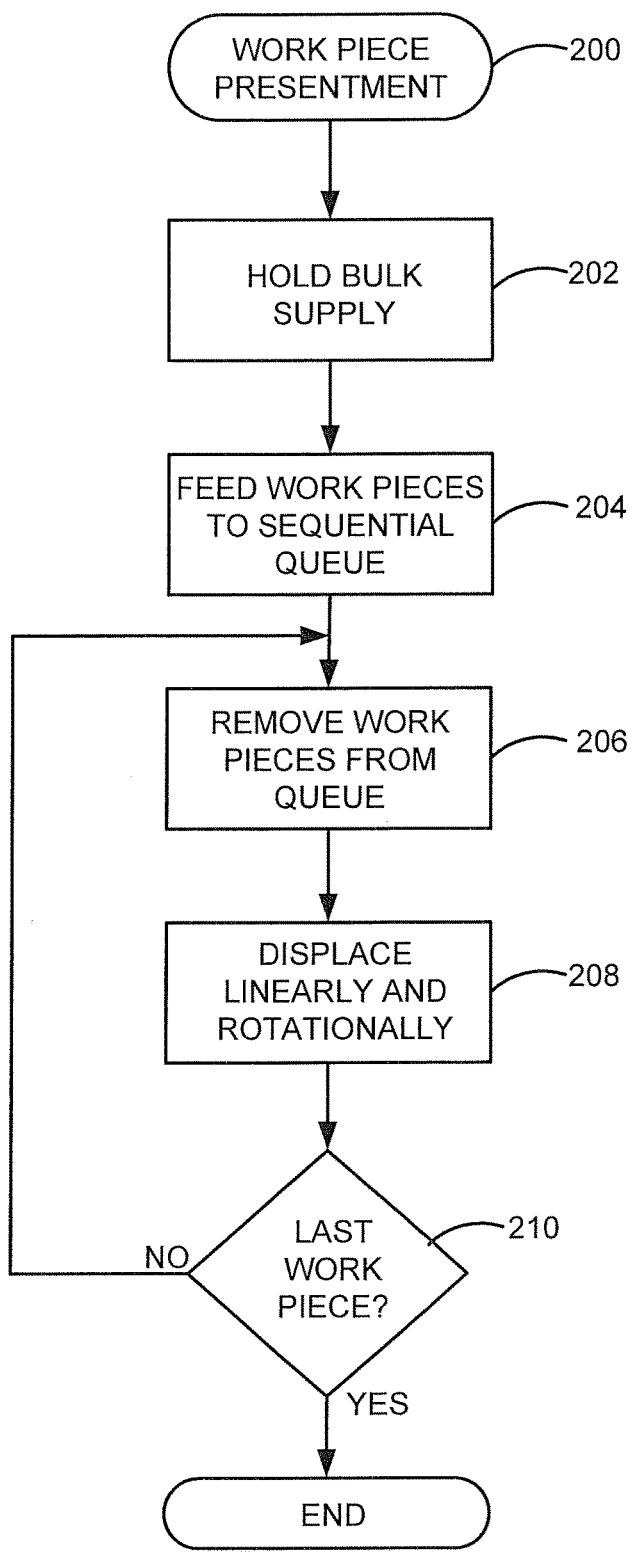
FIG. 6 is a flowchart depicting steps in a method for WORK PIECE PRESENTMENT in accordance with embodiments of the present invention.

FIG. 6 is a flowchart depicting steps in a method 200 for WORK PIECE PRESENTMENT in accordance with embodiments of the present invention. The method 200 begins in block 202 by holding ready a bulk supply of work pieces that are spatially disposed in random orientations. In block 204 the work pieces are drawn from the bulk supply and sequentially fed to a queue. A work piece is removed from the queue in block 206 and then both linearly and rotationally displaced to a desired longitudinal disposition suited for use by a tooling station in block 208. In block 210 it is determined whether the last work piece has been processed. If the determination of block 210 is no then control returns to block 206; otherwise the method ends.

Generally, the claimed embodiments contemplate a fastener handling apparatus having a feeder arranging a plurality of fasteners sequentially in a queue, and escapement means for removing the fasteners from the queue and reorienting each fastener with respect to its longitudinal axis from one planar orientation in the queue to a different planar orientation for use by a tool station. For purposes of this description and meaning of the appended claims the phrase "escapement means" expressly means the structural aspects of the embodiments disclosed herein and the structural equivalents thereof. For example, without limitation, the disclosed use of a powered slide with the rack and pinion transmission is illustrative of and not limiting of the present embodiments as claimed. For example, one may choose to power the rotational displacement instead of the linear displacement and use a rack and pinion transmission, or alternately power both the rotational and the linear displacements independently and thereby eliminate the rotary/linear dependency constraints of the rack and pinion power transmission. Furthermore, the use of an appropriately sized cavity to remove work pieces from the outlet is likewise illustrative of and not limiting of the present embodiments as claimed. For example, in other embodiments the transfer feature can employ other approaches to capturing a work piece, such as but not limited to using adhesive or magnetic members.

The meaning of "escapement means" expressly does not include attempted solutions that require other structure that is external to the chuck to displace the work piece both linearly and rotationally to achieve the reoriented disposition. For example, the present embodiments as claimed by the "escapement means" language expressly does not contemplate an arrangement whereby one end effector would displace the work piece linearly and then hand it off to another end effector that displaces it rotationally.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary in type or arrangement without departing from the spirit and scope of the present invention.

In addition, although the embodiments described herein are directed to presenting fasteners to a tooling station, it will be appreciated by those skilled in the art that the claimed subject matter is not so limited and various other systems can utilize the present embodiments without departing from the spirit and scope of the claimed invention.

What is claimed is:

1. A method for automatically presenting fasteners to a tool station without orienting them individually by hand, comprising:

holding a bulk supply of the fasteners disposed in a random arrangement;

feeding a plurality of the fasteners from the bulk supply in a sequential queue to an outlet;

removing a fastener from the outlet with a gripper;

displacing the removed fastener with the gripper linearly in a first direction, and rotationally around an axis of rotation that is substantially orthogonal to the first direction to move the removed fastener to a predetermined repeated spatial orientation with respect to the tool station.

2. The method of claim 1 wherein the displacing the removed fastener with the gripper step is characterized by simultaneously displacing the removed fastener both linearly and rotationally.

3. The method of claim 2 wherein the displacing the removed fastener with the gripper step is characterized by the rotational displacement being responsive to the linear displacement.

4. The method of claim 1 wherein the removing a fastener from the outlet with a gripper step is characterized by receivingly engaging a fastener from the outlet into a cavity sized to capture the fastener.

5. The method of claim 1 wherein the removing a fastener from the outlet with a gripper step is characterized by stripping the fastener from the queue during movement of the gripper to retain non-removed fasteners in the queue.

6. An automated presentment assembly comprising:

a sequential feeder delivering fasteners to an outlet; and a gripper that selectively removes a fastener from the outlet and transports the fastener to another location, the gripper being moveable between a first position and a second position, wherein the gripper is configured to operably align with a fastener at the outlet at the first position, and the gripper is configured to displace the fastener from the outlet both linearly and rotationally to the second position.

7. The assembly of claim 6 wherein each fastener has a tooling engagement head and a shank extending therefrom, wherein the gripper displaces the aligned fastener from a downward directed shank disposition at the outlet to an upward directed shank disposition at the second position.

8. The assembly of claim 7 comprising a body in which the gripper is journaled for rotation, the body supported by an extensible slide.

9. The assembly of claim 8 comprising:

a pinion that is fixed in rotation with the gripper; and a rack that meshingly engages the pinion to rotate the gripper in response to linear movement of the slide.

10. The assembly of claim 9 wherein the gripper defines a first reference surface that engages a first stop surface when the gripper is at the first position and a second reference surface that engages a second stop surface when the gripper is at the second position.

11. The assembly of claim 10 comprising a bias member urging the gripper to a rotational position associated with the first position.

12. The assembly of claim 6 comprising a motor that selectively rotates the gripper.

13. The assembly of claim 6 wherein the gripper defines a cavity that is sized to receivingly engage the one of the fasteners from the outlet.

14. The assembly of claim 13 comprising a vacuum supply selectively communicating a fluid force to the cavity to retain the one of the fasteners therein.

15. The assembly of claim 13 wherein the gripper defines a first stripping surface adjacent the cavity that closes the outlet when the gripper is displaced from the first position.

16. The assembly of claim 15 wherein the gripper defines a second stripping surface adjacent the first stripping surface that closes the outlet when the first stripping surface is displaced from the outlet.

17. The assembly of claim 6 wherein the sequential feeder comprises a vibratory feeder drawing the fasteners from a bulk supply where tooling engagement ends of the fasteners are arranged randomly, and sequentially queuing the fasteners with the tooling engagement end in a desired spatial orientation at the outlet.

18. A method for automatically presenting fasteners to a tool station without orienting them individually by hand, comprising:

holding a bulk supply of the fasteners disposed in a random arrangement;

feeding a plurality of the fasteners from the bulk supply in a sequential queue to an outlet;

removing a fastener from the outlet with a gripper;

simultaneously displacing the removed fastener with the gripper both rotationally and linearly to a predetermined repeated spatial orientation with respect to the tool station, the rotational displacement responsive to the linear displacement.

\* \* \* \* \*